United States Patent [19]
Bojas

[11] Patent Number: 5,361,880
[45] Date of Patent: Nov. 8, 1994

[54] VISCOUS CONVERTER CLUTCH WITH O-SLIP CAPABILITY

[75] Inventor: Edward J. Bojas, Marshall, Mich.

[73] Assignee: Eaton Corporation, Cleveland, Ohio

[21] Appl. No.: 125,603

[22] Filed: Sep. 22, 1993

[51] Int. Cl.$^5$ .............................................. F16H 45/02
[52] U.S. Cl. .................................. 192/3.25; 192/3.29; 192/3.33
[58] Field of Search .................... 192/3.25, 3.26, 3.29, 192/3.3, 3.33

[56] References Cited

U.S. PATENT DOCUMENTS

| | | | |
|---|---|---|---|
| 3,463,033 | 8/1969 | Fisher | 192/3.26 X |
| 4,423,803 | 1/1984 | Malloy | 192/3.29 |
| 4,557,357 | 12/1985 | Tinholt | 192/3.21 |
| 4,638,897 | 1/1987 | Nishimura | 192/3.3 |
| 4,643,283 | 2/1987 | Wonn | 192/3.33 |
| 4,934,495 | 6/1990 | Lemon | 192/3.26 |
| 5,044,477 | 9/1991 | Bojas et al. | 192/3.29 |
| 5,125,486 | 6/1992 | Murata | 192/3.26 |
| 5,172,796 | 12/1992 | Campbell et al. | 192/3.29 |

Primary Examiner—Richard M. Lorence
Attorney, Agent, or Firm—L. J. Kasper

[57] ABSTRACT

A bypass assembly (27) is disclosed for use in a torque converter (15) of an automatic transmission. The assembly includes a fluid coupling (29) and a driveplate assembly (31) which cooperate with the torque converter and its housing (22) to define a release pressure chamber (R), a first apply chamber (A1), and a second apply chamber (A2). At relatively low vehicle speeds, and relatively high levels of driveline vibration, the assembly operates in a release mode. At medium vehicle speeds, and medium levels of vibration, the pressures in the apply chambers (A1) and (A2) are approximately the same, and only the fluid coupling (29) is in operable engagement. At relatively higher vehicle speeds, and at relatively lower levels of vibration, the pressure in the apply chamber (A1) increases, moving a valve member (115) in opposition to a spring (123) to an open position, draining pressure from the second apply chamber (A2) to the release chamber (R). Pressure in the first apply chamber (A1) biases both the driveplate assembly (31) and the fluid coupling (29) into frictional engagement with the torque converter housing (22), such that torque is transmitted through the driveplate assembly, which acts as a O-slip device, while the fluid coupling (29) dampens oscillations and torsional vibrations through the driveplate.

13 Claims, 2 Drawing Sheets

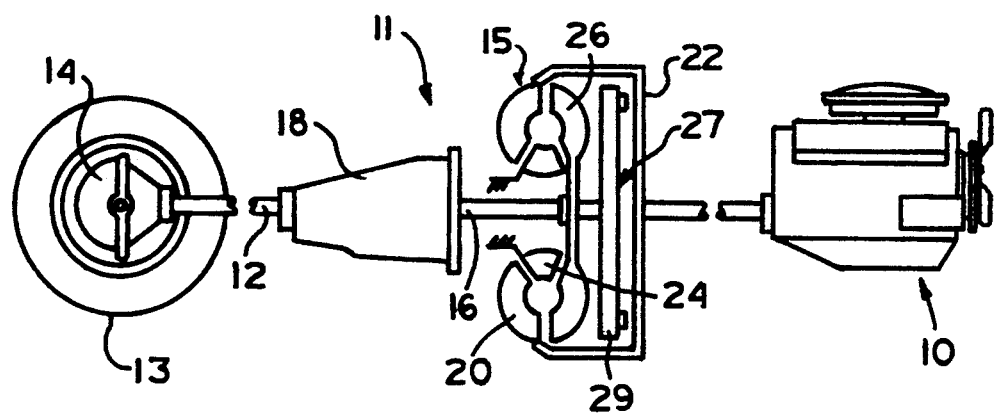
FIG. 1
FIG. 3
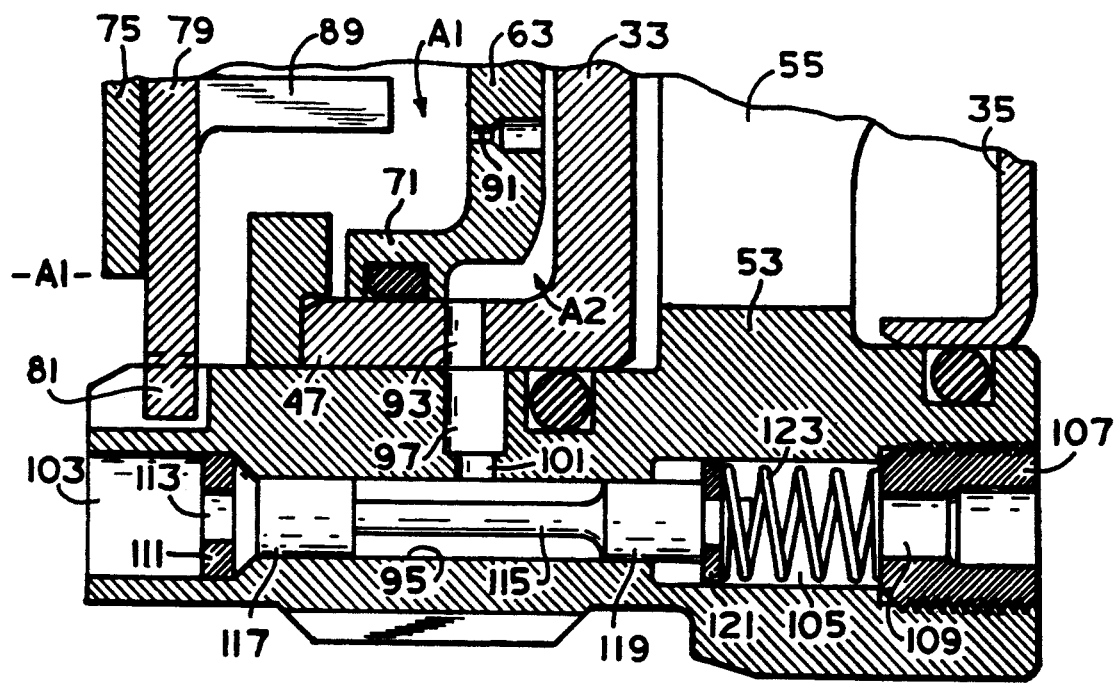

VISCOUS CONVERTER CLUTCH WITH O-SLIP CAPABILITY

BACKGROUND OF THE DISCLOSURE

The present invention relates to torque converter by-pass elements of the type which are now employed in automatic transmission torque converters, and more particularly, to such elements of the type including a fluid coupling.

Torque converter type automatic transmissions have achieved widespread application and acceptance in motor-vehicles. Although generally satisfactory in this application, torque converter type automatic transmissions inherently involve a certain amount of slippage, and therefore, inherently result in losses in vehicle fuel economy. In an effort to minimize such slippage, and thereby increase fuel economy, efforts have been made to by-pass the torque converter with some type of relatively direct drive, which typically is activated when the vehicle is operating in the higher gear ratios, or above a predetermined vehicle speed. Although the term "by-pass" is used in regard to this type of element, those skilled in the art will understand theft the element is actually transmitting torque in parallel with the torque converter.

While such prior art direct drive by-pass elements have resulted in improvements in fuel economy, certain types of by-pass elements heretofore utilized have, under certain operating conditions, transmitted various driveline vibrations to the passenger compartment of the vehicle, causing degradation of the ride quality of the vehicle. In an effort to provide a by-pass element which would not transmit driveline vibration to the passenger compartment, those skilled in the art have utilized a viscous coupling as the by-pass element. Although the use of a viscous coupling as the by-pass element does serve to minimize the transmission of driveline vibration, it does still involve a certain amount of slippage and loss of fuel economy.

One type of device which is now well known to those skilled in the art, although not Vet in widespread commercial usage, is a device referred to as a "O-slip damper", an example of which is illustrated and described in U.S. Pat. No. 4,557,357, assigned to the assignee of the present invention and incorporated herein by reference. The O-slip damper of the above-incorporated patent is referred to as "O-slip" primarily because torque is transmitted through a pair of nested, helical springs, such that there is really no slip between the input and the output. However, there are oscillations and torsional vibration which must be damped, and for that purpose, the damper includes a viscous coupling capable of dampening oscillatory movement between the input and output.

Subsequently, similar devices have been developed wherein torque is transmitted initially (at relatively low speeds), and at relatively high levels of driveline vibration, through the torque converter, but with increasing vehicle speed (or decreasing drive line vibration), there is an increasing apply pressure tending to bias the entire damper assembly into frictional engagement with the torque converter housing, thus at least partially by-passing the torque converter. It has been determined that O-slip dampers engage over a very short time period, and therefore, the change from, for example, 500 rpm slip through the torque converter to 0 rpm slip through the O-slip damper also occurs over a very short time. The result may be a decrease in the quality of the ride, as perceived by the vehicle driver.

A different approach to the problem of achieving increased fuel efficiency without adversely affecting the ride quality may be seen in the lock-up clutch (by-pass element) illustrated in U.S. Pat. No. 5,125,486. The device of the above-incorporated patent includes drive and driven members which together define a viscous coupling. Therefore, at relatively low vehicle speeds, and at relatively high levels of driveline vibration, the torque converter is by-passed by the viscous coupling. The drive and driven members cooperate to define a cone clutch, which is engaged as vehicle speed increases, and apply pressure increases, moving the drive member axially until the cone clutch engages. After engagement of the cone clutch, the device operates in the manner of a O-slip device, with oscillations and torsional vibrations damped by a set of circumferentially arranged coil springs constituting a torsional damper. In the lock-up clutch of the referenced patent, the need for axial movement of one of the members of the viscous coupling, in order to achieve engagement of the cone clutch, results in a very difficult sealing arrangement for separating the viscous fluid from the ATF (Automatic Transmission Fluid). In addition, because the members of the viscous coupling comprise the confronting members of the cone clutch, after engagement of the cone clutch, and while operating on the coil springs, there is no longer any viscous damping of oscillation and torsional vibration.

SUMMARY OF THE INVENTION

Accordingly, it is an object of the present invention to provide an improved by-pass assembly for use in a torque converter, which achieves the advantages of a viscous coupling at relatively lower speeds, and at relatively higher levels of driveline vibration, while having O-slip capability at higher speeds, and at lower vibrations, and which overcomes the disadvantages of the prior art discussed above.

The above and other objects of the invention are accomplished by the provision of an improved by-pass assembly for use in a torque converter including a torque converter housing and an output shaft. The by-pass assembly includes a fluid coupling of the type including an annular housing assembly adapted to be positioned within the torque converter housing, and defining an annular fluid chamber therein, the annular housing assembly defining a first radially-extending annular clutching surface adapted for clutching coaction with a confronting surface of the torque converter housing. An annular clutch assembly is disposed within the fluid chamber, and includes an axially-extending clutch hub portion adapted to be drivingly associated with the output shaft of the torque converter. The fluid coupling cooperates with the torque converter housing to define a release pressure chamber, and cooperates with the torque converter to define an apply pressure chamber.

The improved by-pass assembly is characterized by a driveplate being operable to separate the apply pressure chamber into a first apply chamber disposed between the torque converter and the driveplate, and a second apply chamber disposed between the driveplate and the fluid coupling. The driveplate includes drive means in operable engagement with the clutch hub portion, and a second radially-extending annular clutching surface adapted for clutching coaction relative to the confronting surface of the torque converter housing. The by-pass assembly includes valve means operable in response to a fluid pressure in the first apply chamber to control the fluid pressure differential between the first and second apply chambers, thereby controlling the net fluid pressure tending to bias the second annular clutching surface into clutching coaction relative to the confronting surface of the torque converter housing.

BRIEF DESCRIPTION OF THE DRAWINGS

FIG. 1 is a schematic view of a motor vehicle drive train including an automatic transmission of the torque converter type, employing a by-pass assembly made in accordance with the present invention.

FIG. 3 is a fragmentary, enlarged, axial cross-section, similar to FIG. 2, but taken on a different plane.

DESCRIPTION OF THE PREFERRED EMBODIMENTS

Figure 2:
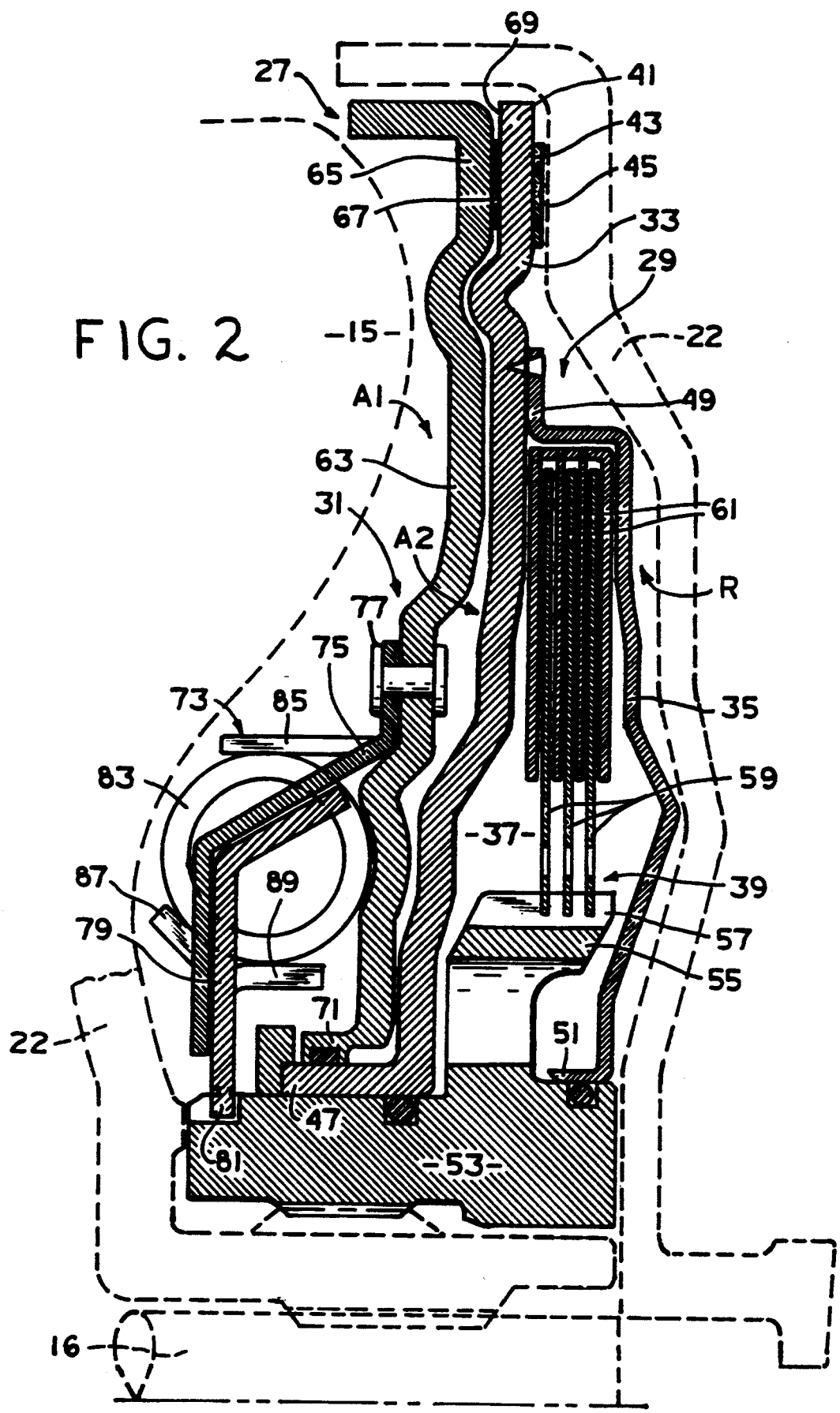
FIG. 2 is an axial cross-section, illustrating the upper half of a torque converter by-pass assembly made in accordance with the present invention.

Referring now to the drawings, which are not intended to limit the invention, FIG. 1 shows schematically a motor vehicle drive train, including an internal combustion engine 10, an automatic transmission 11, and a propeller shaft 12 driving wheels (front or rear) 13 through a differential 14. The automatic transmission 11 includes a torque converter 15 having an output shaft 16 and a gear ratio box 18, the box 18 being driven by the torque converter output shaft 16. The torque converter 15 is filled with automatic transmission fluid ("ATF") and includes, in a manner well known in the art, a pump element 20 driven by the engine 10 through a torque converter housing 22 (shown also in FIG. 2). The torque converter 15 also includes a stator 24, and a turbine 26 which is driven hydrokinetically by the pump 20. The torque converter 15 further includes a by-pass assembly, generally designated 27, the by-pass assembly 27 being effective, when actuated, to provide a direct drive from the torque converter housing 22 to the torque converter output shaft 16, thus transmitting torque to the output shaft 16, in parallel with (by-passing) the high slippage drive path through the pump 20 and turbine 26. The details of the positioning of the by-pass assembly 27 within the torque converter 15 are illustrated and described further in above-incorporated U.S. Pat. No. 5,044,477, assigned to the assignee of the present invention, and incorporated herein by reference.

In accordance with the present invention, the by-pass assembly 27 comprises a fluid coupling, generally designated 29, and a drive plate assembly, generally designated 31. The fluid coupling 29 is preferably a viscous coupling, and more specifically, may be made in accordance with the teachings of U.S. Pat. No. 5,172,796, assigned to the assignee of the present invention and incorporated herein by reference.

The fluid coupling 29 is generally annular, and generally planar, and includes an annular housing assembly comprising a body member 33, and a cover member 35. The body member 33 and cover member 35 cooperate to define an annular fluid chamber 37, and a clutch assembly, generally designated 39, is disposed within the fluid chamber 37. The body member 33 and the cover member 35 are preferably formed as metal stampings, while the clutch assembly 39 will be described in greater detail subsequently.

The body member 33 includes a radially outer peripheral portion 41, which includes on its forward surface (right side in FIG. 2) an annular ring of friction material 43 disposed to engage an adjacent, confronting surface 45 of the torque converter housing 22. The body member 33 terminates in an axially-extending hub portion 47. The cover member 35 includes a radially outer peripheral portion 49 which is attached to the body member 35, and terminates in a radially inner axially-extending hub portion 51.

The clutch assembly 39 includes an annular, axially-extending clutch hub portion 53, and a generally radially-extending mounting portion 55 which, preferably, terminates in a set of external splines 57. In splined engagement with the external splines 57 is a plurality of clutch plates 59. Disposed axially between the adjacent clutch plates 59, but having no engagement with the splines 57, is a pair of housing plates 61. Preferably, the housing plates 61 are fixed relative either the body member 33 or cover member 35, for rotation therewith. Also, as is now well known from above-incorporated 5,172,796, rotation of the body 33 and cover 35 results in rotation of the housing plates 61, and torque is thereby transmitted to the clutch assembly 39, and more specifically, to the clutch plates 59, by means of viscous shear drag between the housing plates and clutch plates, if the fluid chamber 37 contains an appropriate viscous fluid. Although the fluid coupling 29 has been illustrated and described herein as being of the plate type, those skilled in the art will understand that the fluid coupling portion of the present invention could also take various other forms, such as the interdigitated land and groove type illustrated in above-incorporated U.S. Pat. No. 5,044,477. Therefore, the specific construction of the fluid coupling 29 is not an essential feature of the present invention.

Referring still primarily to FIG. 2, the drive plate assembly 31 includes a drive plate 63. The drive plate 63 includes a radially outer terminal portion 65, and disposed on the forward surface of the portion 65 is an annular ring of friction material 67. The friction material 67 is disposed for clutching co-action with an adjacent, confronting surface 69 of the peripheral portion 41 of the fluid coupling 29. Preferably, the friction material 67 may be the same material, and may even have the same dimensions and part number as the friction material 43. The drive plate 63 also includes a radially inward annular hub portion 71, seated on the outer surface of the body hub portion 47. Alternatively, the terminal portion 65 could be configured such that the friction material 67 is in direct clutching coaction with the confronting surface 45 of the torque converter housing. Obviously, this would increase the radial dimension of the by-pass assembly 27 (or reduce the radial dimension of the fluid coupling 29), and therefore, for most applications would be undesirable. However, those skilled in the art will understand that references hereinafter, and in the appended claims, to the friction material 67 being adapted for clutching coaction relative to the confronting surface 45 of the torque converter housing can mean and include either of the alternatives described above.

The drive plate assembly 31 preferably includes a torsion damping portion, generally designated 73. The damping portion 73 includes an input member 75 attached to the drive plate 63 by a plurality of rivets 77

(only one of which is shown in FIG. 2). The damping portion 73 further includes an annular output member 79 defining, at its radially inward periphery, a set of internal splines 81 which are in splined engagement with a set of external splines defined by the clutch hub portion 53.

The torsion damping portion 73 may be constructed in a manner which is now well known to those skilled in the art, and which is illustrated and described in greater detail in U.S. Pat. No. 4,987,987, assigned to the assignee of the present invention, and incorporated herein by reference. The annular input member 75 and output member 79 cooperate to define a plurality of overlapping "windows", arranged preferably on a constant radius about the axis of rotation of the by-pass assembly 27. Disposed within each of the overlapping windows (only one of which is shown in FIG. 2) is a coiled compression spring 83, which is retained within the window by means of a plurality of generally axially-extending tabs, including an upper tab 85 and a lower tab 87, both of which comprise part of the input member 75, and are formed, preferably, during the stamping thereof. In addition, there is a lower tab 89 which comprises part of the output member 79 and, preferably, is formed during the stamping thereof.

As is generally well known to those skilled in the art of torque converters and by-pass devices for use therein, the by-pass assembly 27 cooperates with the torque converter housing 22 to define therebetween a release pressure chamber R. Fluid pressure in the chamber R is operable to release or disengage the friction material 43 from the confronting surface 45. As is also well known to those skilled in the art, the by-pass assembly 27 cooperates with the torque converter 15 to define an apply pressure chamber, and fluid pressure in that chamber tends to "apply" or bias the by-pass device into frictional engagement with the torque converter housing. However, in accordance with one important aspect of the present invention, the inclusion in the by-pass assembly 27 of the drive plate assembly 31 serves to separate the conventional, well-known apply pressure chamber into a first apply chamber A1, disposed between the torque converter 15 and the drive plate 63, and a second apply chamber A2, disposed between the drive plate 63 and the body member 33 of the fluid coupling 29.

Referring now primarily to FIG. 3, which is taken on a different plane than FIG. 2, additional aspects of the present invention will be described in some detail. The drive plate 63, at a location radially adjacent the hub portion 71, defines a lock-up orifice 91, which is disposed to permit restricted fluid communication from the first apply chamber A1 to the second apply chamber A2, under certain conditions, to be described subsequently. The body hub portion 47 defines an orifice 93, operable to provide relatively unrestricted fluid communication out of the second apply chamber A2, again under certain conditions to be described subsequently.

The clutch hub portion 53 defines an axially-extending valve bore 95, which is in open communication with the orifice 93 by means of an annular groove 97 and a fluid passage 101, communicating directly into the bore 95. The valve bore 95 is a multi-stepped bore including an upstream bore portion 103, in open communication with the first apply chamber A1, and a downstream bore portion, in open communication with the release pressure chamber R. The terms "upstream" and "downstream" are used herein to indicate the normal direction of fluid flow, i.e., fluid would normally flow from the first apply chamber A1 to the release chamber R, rather than flowing in the opposite direction.

Disposed within a downstream, threaded portion of the bore portion 105 is a threaded plug 107, defining a central open passage 109 which permits fluid flow therethrough under certain operating conditions to be described subsequently. Pressed into the upstream bore portion 103 is a stop member 111 defining a central opening, the function of which will be described subsequently.

Disposed within the valve bore 95 is a spool valve member 115 including an upstream spool land 117, and a downstream spool land 119. Disposed adjacent the end of the spool land 119 is an orifice member 121, the function of which will be described subsequently, but which also serves as a seat for a compressions spring member 123. In the absence of fluid pressure, the spring member 123 biases the spool valve member 115 rearwardly (to the left in the figures), preferably to a position in which the upstream end of the spool end 117 is seated against the stop member 111.

RELEASE MODE

Referring now to both FIGS. 2 and 3, the operation of the by-pass assembly 27 in the release mode will be described. It should be understood by those skilled in the art that in conjunction with the description of this and subsequent operating modes, references to particular fluid pressures in the various chambers R, A1, and A2, and to particular vehicle speeds, are by way of example only, and to assist in an understanding of the invention. Furthermore, the references to vehicle speeds are includes partly as a point of reference. Those skilled in the art will understand that selection among the various operating modes may be dependent more upon the level of driveline vibration which occurs, than upon actual vehicle speed.

During operation at relatively low vehicle speeds, for example, 20 miles per hour, a fluid pressure of about 70 psi is maintained in the release chamber R, as well as in each of the apply chambers A1 and A2. With the fluid pressure in all three chambers being substantially equal, fluid flows through the center of the by-pass assembly 27, through the release chamber R, then radially outward around the outside of the assembly 27. Under the conditions described, the friction material 43 is out of operable engagement with the confronting surface 45, and similarly, the friction material 67 is out of operable engagement with the confronting surface 69. As will be understood by those skilled in the art, the friction materials and confronting surfaces may be physically in contact, i.e., touching, but without sufficient biasing force to be in true, "operable engagement", i.e., in torque-transmitting engagement.

While operating in the release mode, substantially all drive torque is transmitted from the torque converter housing 22 through the pump 20, the turbine 26, and the output shaft 16, while substantially none of the drive torque is transmitted through the bypass assembly 27.

FLUID COUPLING MODE

Referring now primarily to FIG. 2, as the vehicle speed increases (e.g., above 20 mph), and the need for driveline damping decreases, the pressure in the first and second apply chambers A1 and A2, respectively, may actually be somewhat decreased. However, the restriction downstream of the release chamber R is open sufficiently such that the fluid pressure in the release chamber R drops to substantially 0 psi. Those skilled in the art will understand that the changes in pressure being described in the various chambers are accomplished by means of the automatic transmission control circuitry, and achieving the various pressures required to practice the present invention is believed to be well within the ability of those skilled in the automatic transmission art, based on parameters such as the particular engine mounts being used, the engine firing pulses, the particular vehicle suspension in use, and the stiffness of the driveline.

Referring now to FIG. 3, in conjunction with FIG. 2, as the fluid pressure in the first apply chamber A1 reaches approximately 50 psi, the pressure in the second apply chamber A2 is also at substantially 50 psi. Fluid is able to flow from the first apply chamber A1 through the windows surrounding the springs 83, to the second apply chamber A2 through the lock-up orifice 91, but with the spool valve member 115 in the position shown in FIG. 3, fluid is unable to flow out of the second apply chamber A2, and thus, the two apply chambers achieve equal pressures. The fluid pressure of 50 psi in the second apply chamber A2 biases the fluid coupling 29, and specifically, the body member 33, such that the friction material 43 is now in operable engagement with the confronting surface 45. At the same time, with pressures being equal on both sides of the driveplate assembly 31, the friction material 67 remains disengaged from the confronting surface 69. Therefore, substantially all by-pass torque is transmitted through the torque converter housing 22, then through the fluid coupling 29 (and specifically, from the housing plate 61 to the clutch plates 59), then to the output shaft 16, in a manner which is well known to those skilled in the viscous coupling art.

It is believed that the by-pass assembly 27 of the present invention will provide a better ride quality by providing a better transition from the release mode to the fluid coupling mode. As was alluded to in the BACKGROUND OF THE DISCLOSURE, the amount of slip through the torque converter at relatively low speeds may be in the range of about 500 rpm. In a O-slip type device, the transition from torque converter operation ("release mode" in the present invention) to operation through the O-slip damper results in a fairly sudden change from the approximately 500 rpm slip to the O-slip. As is well known to those skilled in the art, with a O-slip type device, the transition or engagement of the O-slip damper must occur in a very short period of time. It is not acceptable to apply the O-slip damper gradually, because the torque being transmitted through the friction material would damage or destroy the friction material. By way of contrast, with the fluid coupling 29 of the present invention comprising the second mode of operation, even with the friction material 43 being applied to the confronting surface 45 very quickly, the total time required to go from full slip to minimum slip (about 50 rpm in the case of the fluid coupling 29) would typically be about 3 to 4 times as long as in the case of the transition from torque converter operation to O-slip operation. Thus, the ride quality at the point of transition will be substantially improved, as perceived and felt by the vehicle driver.

It should be noted that reference has been made herein to a "fluid coupling" in referring to the item 29 because, although a viscous type coupling may be the preferred embodiment, it is not an essential feature of the invention that the coupling 29 includes viscous fluid. It is one important aspect of the present invention that the fluid coupling 29 is involved in transmitting a portion of the vehicle torque during only a medium or intermediate speed range, and therefore, does not have to be designed and sized such that it is capable of providing maximum torque transmission, at relatively higher vehicle speeds. Thus, it may be possible to design the overall device, and specifically the fluid coupling 29, such that it does not require a high viscosity fluid. For example, because of the reduced operating requirements for the fluid coupling 29, as compared to a typical viscous converter clutch now being sold commercially by the assignee of the present invention, it may be possible to simply permit the fluid coupling 29 to contain a certain quantity of the ATF, thus eliminating the need for sealing the fluid chamber 37 from communication with the surrounding release and apply chambers, which contain ATF.

LOCK-UP MODE

As the vehicle speed increases further (e.g., to about to about 40 mph), and the need for driveline damping decreases even further, the pressure in the first apply chamber A1 is increased to about 80 psi. This increased pressure in the first apply chamber A1 is also present in the upstream bore portion 103, and acts (through the central opening 113) on the upstream end of the spool land 117. The rise in pressure to about 80 psi is sufficient to overcome the biasing force of the spring member 123, such that the spool valve member 115 shown in FIG. 3, is biased to the right in FIG. 3, far enough to disengage the downstream spool land 119 from the valve bore 95. When the valve member 115 is in the actuated position as described, fluid is able to flow from the second apply chamber A2 through the orifice 93, through the annular groove 97, and fluid passage 101, then through the valve bore 95, past the land 119, then through the downstream bore portion 105 and passage 109 into the release chamber R. During this mode of operation, the release chamber R is still at essentially 0 psi, but because the flow path from the second apply chamber A2 to the release chamber R would typically be somewhat restricted, a pressure of about 10 psi would be maintained in the second apply chamber A2.

Thus, with a pressure of 80 psi in the first apply chamber A1, and a pressure of 10 psi in the second apply chamber A2, the driveplate 63 and its friction material 67 are biased into operable engagement with the confronting surface 69, and in turn, the peripheral portion 41 of the body member 33, and its friction material 43, are biased into operable engagement with the confronting surface 45 of the torque converter housing 22. With the by-pass assembly 27 in the condition just described, substantially all torque not being transmitted through the torque converter 15 is now being transmitted through the driveplate assembly 31, thus providing, in effect, a O-slip drive connection from the torque converter housing 22 to the output shaft 16, with the torque being transmitted through the compression springs 83 in a manner well known to those skilled in the art. It should be noted that, with the by-pass assembly 27 operating in the lock-up mode, the fluid coupling 29 now serves as a damper for oscillations and torsional vibration which would otherwise be transmitted to the output shaft 16 by virtue of the fact that the driveplate assembly 31 is essentially a direct mechanical connection.

Although the driveplate assembly 31 of the present invention is illustrated and described as including coiled compression springs 83, it should be noted that for certain vehicle applications, and depending upon the vehicle speed at which the lock-up mode is initiated, it may be possible to eliminate the springs 83, and merely provide the driveplate 63 in a configuration such that it defines the internal splines 81. In other words, the driveplate would comprise a single, direct-drive member, when the friction material is operably engaged, from the torque converter housing 22 to the output shaft 16.

It is believed that one advantage of the configuration of the by-pass assembly 27 is the location of both of the friction liners (friction material 43 and 67) at nearly the maximum possible diameter within the torque converter housing 22, and aligned such that apply pressure acting on the driveplate 63 (i.e., during the lock-up mode) increases the frictional engagement of both friction liners at once. Furthermore, by both friction liners being at nearly the maximum possible diameter, the torque transmission through the liners is maximized.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A bypass assembly for use in a torque converter including a torque converter housing and an output shaft; said bypass assembly including a fluid coupling of the type including an annular housing assembly adapted to be positioned within the torque converter housing, and defining an annular fluid chamber therein, said annular housing assembly defining a first radially-extending annular clutching surface adapted for clutching coaction with a confronting surface of the torque converter housing; an annular clutch assembly disposed within said fluid chamber and including an axially-extending clutch hub portion adapted to be drivingly associated with the output shaft of the torque converter; said fluid coupling cooperating with the torque converter housing to define a release pressure chamber and cooperating with the torque converter to define an apply pressure chamber; characterized by:
   (a) said bypass assembly further comprising a drive plate assembly disposed to separate said apply pressure chamber into a first apply chamber disposed between the torque converter and said drive plate assembly, and a second apply chamber disposed between said drive plate assembly and said fluid coupling;
   (b) said drive plate assembly including drive means in operable engagement with said clutch hub portion, and a second radially-extending annular clutching surface adapted for clutching coaction relative to the confronting surface of the torque converter housing;
   (c) valve means operable in response to a fluid pressure in said first apply chamber, to control the fluid pressure differential between said first and second apply chambers, thereby controlling the net fluid pressure tending to bias said second annular clutching surface into clutching coaction relative to the confronting surface of torque converter housing.

2. A bypass assembly as claimed in claim 1, characterized by said fluid coupling comprising a viscous fluid coupling, said annular clutch assembly being disposed within said annular fluid chamber, and including a radially-extending clutch portion adapted for viscous clutching coaction relative to said annular housing assembly.

3. A bypass assembly as claimed in claim 1, characterized by said annular housing assembly comprising an annular body member defining, toward the radially outer periphery thereof, a forward surface, including said first annular clutching surface, and a rearward surface disposed for clutching coaction with said second annular clutching surface.

4. A bypass assembly as claimed in claim 3, characterized by said first and second annular clutching surfaces being disposed at approximately the same radial location.

5. A bypass assembly as claimed in claim 1, characterized by said drive plate assembly defining fluid passage means operable to permit restricted fluid communication from said first apply chamber to said second apply chamber.

6. A bypass assembly as claimed in claim 5, characterized by said valve means comprises a generally axially-extending valve bore including an upstream portion in open communication with said first apply chamber, an intermediate portion in open communication with said second apply chamber, and a downstream portion in open communication with said release pressure chamber.

7. A bypass assembly as claimed in claim 6, characterized by said valve means including a valve member, and means biasing said valve member toward a first position blocking fluid communication from said intermediate portion to said downstream portion, said valve member being biased by fluid pressure in said upstream portion toward a second position permitting fluid communication from said intermediate portion to said downstream portion.

8. A bypass assembly as claimed in claim 1, characterized by said drive plate assembly including a driveplate defining fluid passage means operable to permit restricted fluid communication from said first apply chamber to said second apply chamber, and a damper portion comprising an input portion fixed to said driveplate, and an output portion including said drive means.

9. A bypass assembly as claimed in claim 8, characterized by said damper portion including spring means disposed between said input portion and said output portion and operable to dampen torsional vibrational movement therebetween.

10. A bypass assembly as claimed in claim 2, characterized by said viscous fluid coupling comprising a body member, a cover member, and at least one annular, radially-extending housing plate disposed axially between said body member and said cover member, said annular clutch assembly including at least two annular, radially-extending clutch plates disposed axially between said body member and said cover member, and drivingly associated with said clutch hub portion, and adapted for viscous clutching coaction relative to said body member, said cover member, and said housing plate.

11. A bypass assembly as claimed in claim 1, characterized by, when the fluid pressure in said release pressure chamber and said first and second apply chamber is approximately equal, both said first and second clutching surfaces are out of clutching coaction relative to the confronting surface of the torque connector housing.

12. A bypass assembly as claimed in claim 11, characterized by, when said release pressure chamber contains fluid at a relatively low pressure and said first and second apply chambers both contain fluid at a relatively higher pressure, but below a predetermined pressure, said first clutching surface is biased into clutching coaction with said confronting surface, but said second clutching surface is out of clutching coaction relative to said confronting surface.

13. A bypass assembly as claimed in claim 12, characterized by, when said release pressure chamber contains fluid at a relatively low pressure, and said first apply chamber contains fluid at said predetermined pressure, said valve means is biased to a position operable to communicate fluid from said second apply chamber to said release pressure chamber, and both said first and second clutching surfaces are biased by pressure in said first apply chamber into clutching coaction relative to said confronting surface.

* * * * *